US011512663B2

(12) United States Patent
Imamura et al.

(10) Patent No.: US 11,512,663 B2
(45) Date of Patent: Nov. 29, 2022

(54) ENGINE WITH COMBUSTION CHAMBER (71) Applicant: Mazda Motor Corporation, Hiroshima (JP)

(72) Inventors: Satoshi Imamura, Aki-gun (JP); Masaki Fukuma, Aki-gun (JP); Naohiro Yamaguchi, Aki-gun (JP); Yoshitaka Wada, Aki-gun (JP); Takumi Uemura, Aki-gun (JP); Keisuke Yamamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/649,413

(22) Filed: Jan. 31, 2022

(65) Prior Publication Data

US 2022/0282687 A1 Sep. 8, 2022

(30) Foreign Application Priority Data

Mar. 8, 2021 (JP) .............................. JP2021-035985

(51) Int. Cl.
*F02B 75/20* (2006.01)
*F02F 3/28* (2006.01)
*F02M 61/14* (2006.01)
*F02B 75/18* (2006.01)

(52) U.S. Cl.
CPC ................ *F02F 3/28* (2013.01); *F02B 75/20* (2013.01); *F02M 61/14* (2013.01); *F02B 2075/1824* (2013.01)

(58) Field of Classification Search
CPC . F02B 2075/125; F02B 2023/106; F02F 3/26; F02D 2041/389

USPC ....................................................... 123/58.1
See application file for complete search history.

(56) References Cited

U.S. PATENT DOCUMENTS

| 6,341,591 | B1 * | 1/2002 | Tsutsumi | .............. F02B 27/001 123/301 |
| 6,588,396 | B1 * | 7/2003 | Cleary | ....................... F02F 3/26 123/301 |
| 6,725,828 | B1 * | 4/2004 | Han | ....................... F02F 1/4214 123/285 |
| 7,707,988 | B2 * | 5/2010 | Irisawa | ................... F02D 41/10 239/533.1 |

(Continued)

FOREIGN PATENT DOCUMENTS

JP 2013241922 A 12/2013

*Primary Examiner* — Long T Tran
*Assistant Examiner* — James J Kim
(74) *Attorney, Agent, or Firm* — Alleman Hall Creasman & Tuttle LLP (57) ABSTRACT An engine is provided, which includes a combustion chamber defined by a piston crown surface, an inner wall surface of a cylinder, and a pentroof ceiling surface formed in a cylinder head, and an ignition part of a spark plug disposed at the ceiling surface to achieve flame propagation combustion inside the combustion chamber. A cavity recessed in a spherical cap shape is formed in a central area of the crown surface. An opening of an intake port is formed in the ceiling surface (intake side) and an opening of an exhaust port is formed in the ceiling surface (exhaust side). When seen in a cross-sectional view taken along a cylinder axis, the ignition part is located above the cavity to be offset toward the exhaust side with respect to a cylinder axial line whereas a cavity center point is located to be offset toward the intake side.

15 Claims, 10 Drawing Sheets

(56) References Cited

U.S. PATENT DOCUMENTS

| | | | | |
|---|---|---|---|---|
| 8,683,783 | B2* | 4/2014 | Suzuki | B01F 25/312 |
| | | | | 60/286 |
| 2009/0025680 | A1* | 1/2009 | Kihara | F02M 61/1813 |
| | | | | 123/299 |
| 2009/0173312 | A1* | 7/2009 | Nishimoto | F02B 17/005 |
| | | | | 123/305 |
| 2009/0194066 | A1* | 8/2009 | Ashizawa | F02B 23/101 |
| | | | | 123/305 |
| 2009/0235897 | A1* | 9/2009 | Fujikawa | F02B 23/104 |
| | | | | 123/305 |
| 2018/0337751 | A1* | 11/2018 | Varadarajan | H04L 43/0829 |

* cited by examiner

ENGINE WITH COMBUSTION CHAMBER

TECHNICAL FIELD

The present disclosure relates to a combustion chamber structure of an engine provided with a combustion chamber defined by a pentroof-type ceiling surface and a crown surface of a piston with a cavity.

BACKGROUND OF THE DISCLOSURE

For the purposes of improving thermal efficiency and fuel efficiency, daily studies have been done on a structure of a combustion chamber of an engine, particularly, on a structure of a piston. For example, JP2013-241922A discloses a combustion chamber provided with a pentroof-type ceiling surface, where a pentroof peak and a spark plug are offset toward an exhaust side with respect to the center axis of a piston.

Generally, in a combustion chamber having a pentroof-type ceiling surface, an intake port is a tumble port. In order to improve the thermal efficiency and the fuel efficiency in such a combustion chamber, it is essential to maintain a tumble flow until a latter half of a compression stroke so as to increase a combustion speed of a mixture gas. However, actually, a structure of the combustion chamber which can meet this requirement at a high level has not yet been proposed.

SUMMARY OF THE DISCLOSURE

The present disclosure is made in view of the above situation, and one purpose thereof is to provide a structure of a combustion chamber having a pentroof-type ceiling surface, capable of increasing combustion speed by utilizing a tumble flow.

According to one aspect of the present disclosure, an engine is provided, which includes a combustion chamber defined by a crown surface of a piston, an inner wall surface of a cylinder in which the piston is slidably accommodated, and a pentroof ceiling surface formed in a cylinder head, and an ignition part of a spark plug disposed at the ceiling surface and configured to achieve flame propagation combustion inside the combustion chamber. A cavity recessed in a spherical cap shape is formed in a central area of the crown surface. An opening of an intake port configured to supply intake air to the combustion chamber and an opening of an exhaust port configured to discharge exhaust gas from the combustion chamber are formed in the ceiling surface. When a side on which the intake port is disposed is an intake side, and a side on which the exhaust port is disposed is an exhaust side, and when seen in a cross-sectional view taken along a cylinder axis, the ignition part is located above the cavity to be offset toward the exhaust side with respect to an axial line of the cylinder, and a center point of the cavity is located to be offset toward the intake side with respect to a cylinder axial line.

According to this structure, since the intake port is formed in the pentroof ceiling surface, a tumble flow is formed inside the combustion chamber. Since the cavity is formed to be recessed in the crown surface of the piston, the tumble flow flows from the exhaust side toward the intake side in the cavity part. In such a combustion chamber, the ignition part is located to be offset toward the exhaust side with respect to the cylinder axial line. With this structure, a mixture gas is ignited at an upstream side of the tumble flow which flows in the cavity part so that a flame is carried by the tumble flow. Further, the cavity center point is located to be offset toward the intake side with respect to the cylinder axial line. With this configuration, it becomes easier for flame generated at the exhaust side to flow toward the intake side by the tumble flow. Therefore, the combustion speed can be increased, and the improvement in thermal efficiency as well as fuel efficiency can be achieved.

An amount of offset of the ignition part toward the exhaust side may be larger than an amount of offset of the center point of the cavity toward the intake side.

According to this structure, it is possible to generate the flame at a further upstream side of the tumble flow which flows in the cavity part, and to propagate the flame toward the intake side. As a result, the combustion can be further accelerated.

The structure may further include a booster configured to boost intake air to be supplied from the intake port to the combustion chamber.

According to this structure, the fuel efficiency can be improved by increasing the combustion speed, while increasing torque by the operation of the booster to increase an amount of intake air.

The structure may further include an injector disposed on the intake side of the combustion chamber and configured to inject fuel into the combustion chamber.

According to this structure, the fuel sprayed from the injector is easily carried by the tumble flow which circulates inside the combustion chamber, and thus, a homogeneous mixture gas can be formed inside the combustion chamber.

The engine may be a longitudinal engine provided with six cylinders arranged in line in a front-and-rear direction of a vehicle on which the engine is mounted.

According to this structure, for the straight-six longitudinal engine, the combustion speed can be increased and the fuel efficiency can be improved.

The center point of the cavity may be a deepest part of the cavity.

The cavity may be disposed at the crown surface such that an intake-side edge of the cavity protrudes toward the intake side from an intake-side edge of a flat surface to overlap with an upper-end part of an intake-side sloped surface, the flat surface being a top surface of the crown surface, and the intake-side sloped surface being a sloped surface gradually rising toward a radially central part of the crown surface.

The cavity may be disposed at the crown surface such that an exhaust-side edge of the cavity is in agreement with an upper end of an exhaust-side sloped surface and an exhaust-side edge of the flat surface, the exhaust-side sloped surface being a sloped surface gradually rising toward a radially central part of the crown surface.

A small cavity may be formed in the crown surface in addition to the cavity, and the small cavity may be formed by an intake-side edge of the cavity and an upper-end area of an intake-side sloped surface being dented in a bowl shape, the intake-side sloped surface being a sloped surface gradually rising toward a radially central part of the crown surface.

BRIEF DESCRIPTION OF DRAWINGS

FIGS. 8A and 8B are plan views of the combustion chamber, schematically illustrating a propagation state of flame, where FIG. 8A is a combustion chamber structure of a comparative example, and FIG. 8B is the combustion chamber structure of this embodiment.

DETAILED DESCRIPTION OF THE DISCLOSURE

External Appearance of Engine

Figure 1:
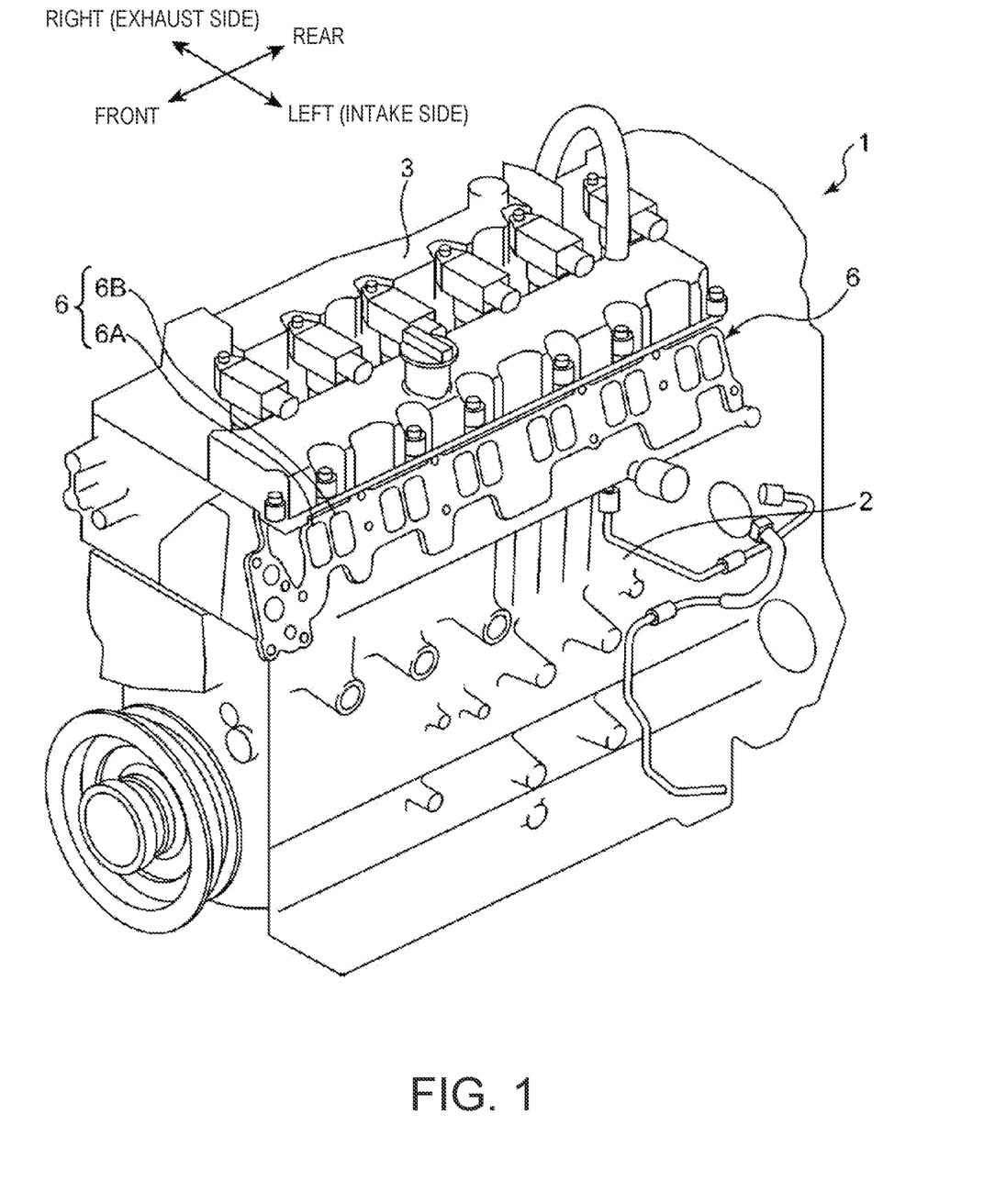
FIG. 1 is a schematic perspective view of a body of a straight-six longitudinal engine to which a combustion chamber structure of an engine according to the present disclosure is applied.

Hereinafter, a combustion chamber structure of an engine according to one embodiment of the present disclosure is described in detail. FIG. 1 is a schematic perspective view of an external appearance of an engine body 1 to which the combustion chamber structure according to this embodiment of the present disclosure is applied. The engine body 1 illustrated in this figure is a four-stroke straight-six gasoline engine provided with a turbocharger, and mounted on a vehicle, such as an automobile, as a drive source for traveling of the vehicle.

In FIG. 1, directions corresponding to the front and rear directions of the vehicle on which the engine body 1 is mounted, are indicated. Six cylinders 20 provided to the engine body 1 are aligned in the front-and-rear direction of the vehicle. That is, the engine body 1 is longitudinally disposed in the vehicle. A layout of a power train of the vehicle is, for example, a front-engine rear-wheel-drive (FR) layout. Each cylinder is a four-valve type (two intake valves and two exhaust valves), and is connected to an intake system and an exhaust system. In FIG. 1, six sets of intake ports 6 each comprised of a first intake port 6A and a second intake port 6B are illustrated to be lined up in the front-and-rear direction of the vehicle.

A combustion mode of the engine body 1 is SI (Spark Ignition) combustion accompanied by flame propagation which is started by a mixture gas inside a combustion chamber forcibly being ignited. The engine body 1 may carry out SPCCI (SPark Controlled Compression Ignition) combustion combining the SI combustion and CI (Compression Ignition) combustion in which the mixture gas is compressed and self-ignites.

Overall Configuration of Engine

Figure 2:
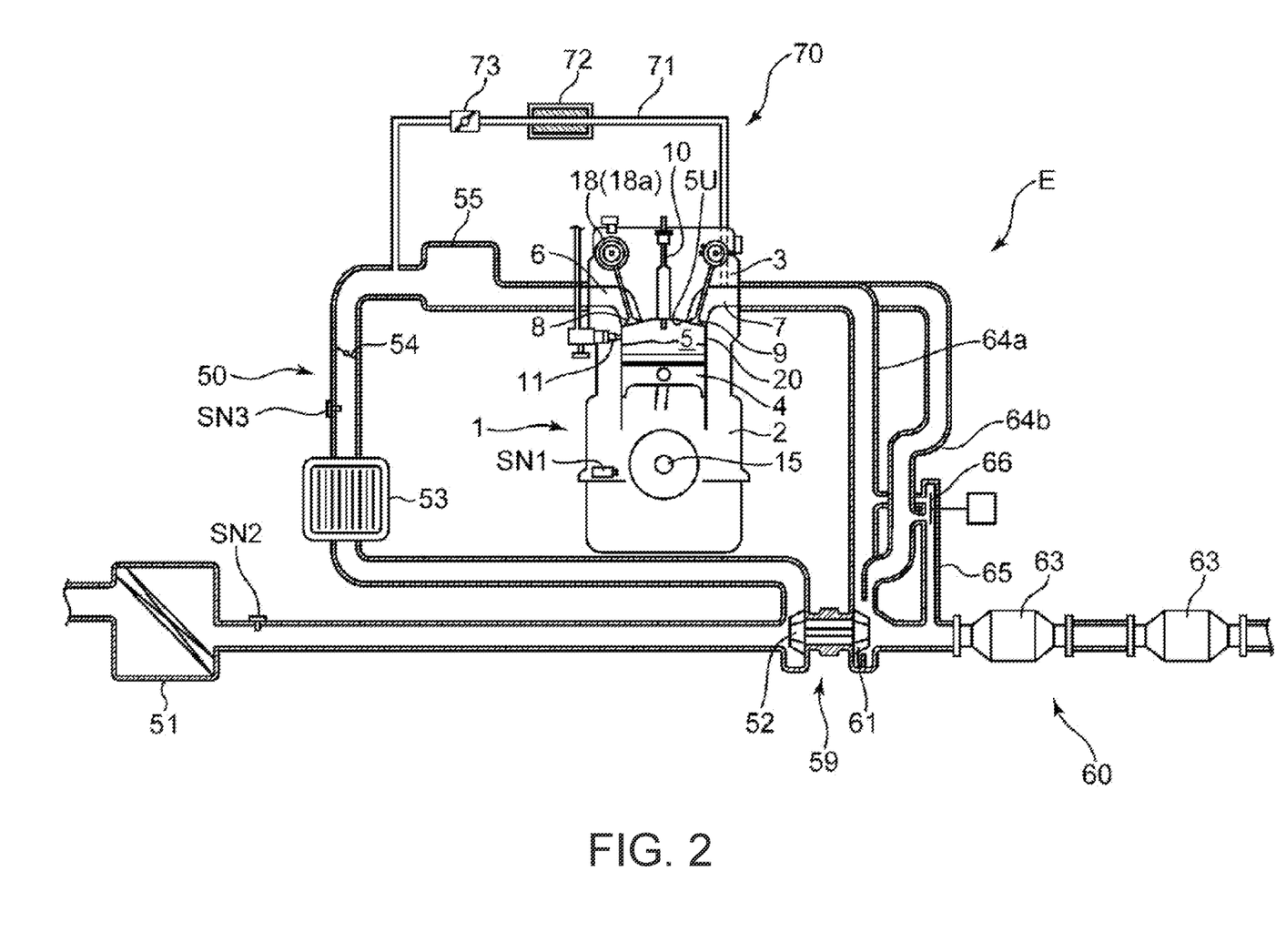
FIG. 2 is a schematic view illustrating a configuration of an engine system provided with the engine body illustrated in FIG. 1.

FIG. 2 is a schematic view illustrating a configuration of an engine system E provided with the engine body 1 illustrated in FIG. 1. The engine system E is provided with the engine body 1, an intake passage 50 which introduces air (intake air) into the engine body 1, an exhaust passage 60 which discharges exhaust gas outwardly from the engine body 1, and an exhaust gas recirculation (EGR) device 70 which recirculates a part of the exhaust gas to the intake passage 50. Further, the engine system E includes a turbocharger 59 which boosts intake air.

The engine body 1 includes a cylinder block 2, a cylinder head 3, and pistons 4. The cylinder block 2 includes the six cylinders 20 lined up in a row. Note that only one cylinder 20 is illustrated in FIG. 2. The cylinder head 3 is attached to an upper surface of the cylinder block 2, and closes an upper opening of the cylinder 20. The pistons 4 are accommodated so as to be reciprocatable in the respective cylinders 20, and each coupled to a crankshaft 15 through a connecting rod. The crankshaft 15 rotates about its center axis corresponding to the reciprocating motion of the piston 4.

A combustion chamber 5 is formed above the piston 4. Fuel containing gasoline as a main component is supplied to the combustion chamber 5 by being injected from an injector 11 (described later). The mixture gas of the supplied fuel and air is combusted in the combustion chamber 5, and the piston 4 which is pushed up by an expansion force caused by the combustion reciprocates in the up-and-down direction. A geometric compression ratio of the cylinder 20 (i.e., a ratio of a volume of the combustion chamber 5 when the piston 4 is at a top dead center to a volume of the combustion chamber 5 when the piston 4 is at a bottom dead center) is set within a range of 11:1 or higher and 13:1 or lower. Note that a normal compression ratio of an engine with a turbocharger is about 10.5:1, and the forementioned compression ratio is higher than the normal one.

The intake port 6 and an exhaust port 7 communicating with each combustion chamber 5 are formed in the cylinder head 3. The intake port 6 is a port through which intake air is supplied to the combustion chamber 5, and the exhaust port 7 is a port through which exhaust gas is discharged from the combustion chamber 5. An intake-side opening which is a downstream end of the intake port 6, and an exhaust-side opening which is an upstream end of the exhaust port 7 are formed in a combustion chamber ceiling surface 5U (ceiling surface) forming a lower surface of the cylinder head 3. An intake valve 8 which opens and closes the intake-side opening, and an exhaust valve 9 which opens and closes the exhaust-side opening are attached to the cylinder head 3. Note that an intake valve operating mechanism 18 which drives the intake valve 8 is provided with an intake variable valve timing mechanism 18a which changes open and close timings of the intake valve 8.

A spark plug 10 and the injector 11 are attached to the cylinder head 3 so as to face toward the combustion chamber 5. The spark plug 10 is disposed at the combustion chamber ceiling surface 5U, and ignites the mixture gas of fuel and air to achieve flame propagation combustion inside the combustion chamber 5. As will be described later, the spark plug 10 is offset toward the intake side on which the intake port 6 is provided, with respect to an axial line of the cylinder.

The injector 11 injects fuel supplied from a fuel system (not illustrated) into the combustion chamber 5. The injector 11 is disposed at a circumferential edge of the combustion chamber ceiling surface 5U on the intake side. According to this layout, the fuel sprayed from the injector 11 is easily carried by a tumble flow which circulates inside the combustion chamber 5, and thus, the fuel is easily spread entirely inside the combustion chamber 5. That is, a homogeneous mixture gas is formed inside the combustion chamber 5.

The intake passage 50 is a path communicating with the intake port 6 and through which intake air is supplied to the combustion chamber 5 of each cylinder 20. Air taken in from an upstream end of the intake passage 50 is introduced into the combustion chamber 5 through the intake passage 50 and the intake port 6. The intake passage 50 is provided therein with an air cleaner 51, a compressor 52 (turbocharger 59), an intercooler 53, a throttle valve 54, and a surge tank 55, in this order from the upstream side.

The air cleaner 51 purifies intake air by removing foreign matters contained in intake air. The compressor 52 rotates about its axis to boost intake air. The intercooler 53 cools intake air compressed by the turbocharger 59. The throttle valve 54 opens and closes the intake passage 50 in response to a depressing operation of an accelerator pedal (not illustrated), and controls a flow rate of intake air passing through the intake passage 50. The surge tank 55 provides a space used for equally distributing intake air to the plurality of cylinders 20.

The exhaust passage 60 is a path communicating with the exhaust port 7 and through which burnt gas (exhaust gas) generated in the combustion chamber 5 is discharged outside the vehicle. The exhaust passage 60 is provided therein with a turbine 61 and a catalytic converter 63. The turbine 61 rotates by an exhaust flow which passes through in the exhaust passage 60. The catalytic converter 63 is built-in with a three-way catalyst, etc. which removes harmful substances (HC, CO, and $NO_x$) contained in the exhaust gas.

The turbocharger 59 includes the compressor 52, the turbine 61, and a common rotational shaft coupling the compressor 52 and the turbine 61. The turbocharger 59 sends out intake air to be introduced into the combustion chamber 5 toward the downstream of the intake passage 50 while boosting (compressing) the intake air. The compressor 52 rotates according to the rotation of the turbine 61 by exhaust flow, thus carrying out the boosting operation.

In this embodiment, a twin-scroll turbocharger is illustrated. Among the six cylinders 20 provided to the engine body 1, exhaust gas of the first to third cylinders 20 is introduced into the turbine 61 through a first exhaust manifold 64a, and exhaust gas of the fourth to sixth cylinders 20 is introduced into the turbine 61 through a second exhaust manifold 64b. Further, the exhaust passage 60 is provided with a bypass passage 65 for bypassing the turbine 61, and a wastegate valve 66 which allows exhaust gas discharged from the first and second exhaust manifolds 64a and 64b to flow into the bypass passage 65. Note that although in this embodiment the turbocharger 59 which uses the pressure of exhaust gas as a driving source is illustrated, alternatively, a supercharger which uses the engine itself as a driving source, or an electric supercharger may be used.

The EGR device 70 is a device which realizes a high-pressure EGR, and includes an EGR passage 71, an EGR cooler 72, and an EGR valve 73. The EGR passage 71 connects between the exhaust passage 60 and the intake passage 50. The EGR cooler 72 cools exhaust gas (EGR gas) to be recirculated from the exhaust passage 60 to the intake passage 50 by a heat exchange. The EGR valve 73 controls a flow rate of exhaust gas passing through the EGR passage 71.

The engine system E includes various sensors. In FIG. 2, an engine speed sensor SN1, an airflow sensor SN2, and a boost pressure sensor SN3 are illustrated. The engine speed sensor SN1 is attached to the cylinder block 2, and detects an engine speed based on a rotational angle of the crankshaft 15. The airflow sensor SN2 is disposed downstream of the air cleaner 51, and detects a flow rate of intake air passing through the intake passage 50. The boost pressure sensor SN3 detects the pressure of the boosted intake air.

Detailed Structures of Combustion Chamber and Piston

Figure 3:
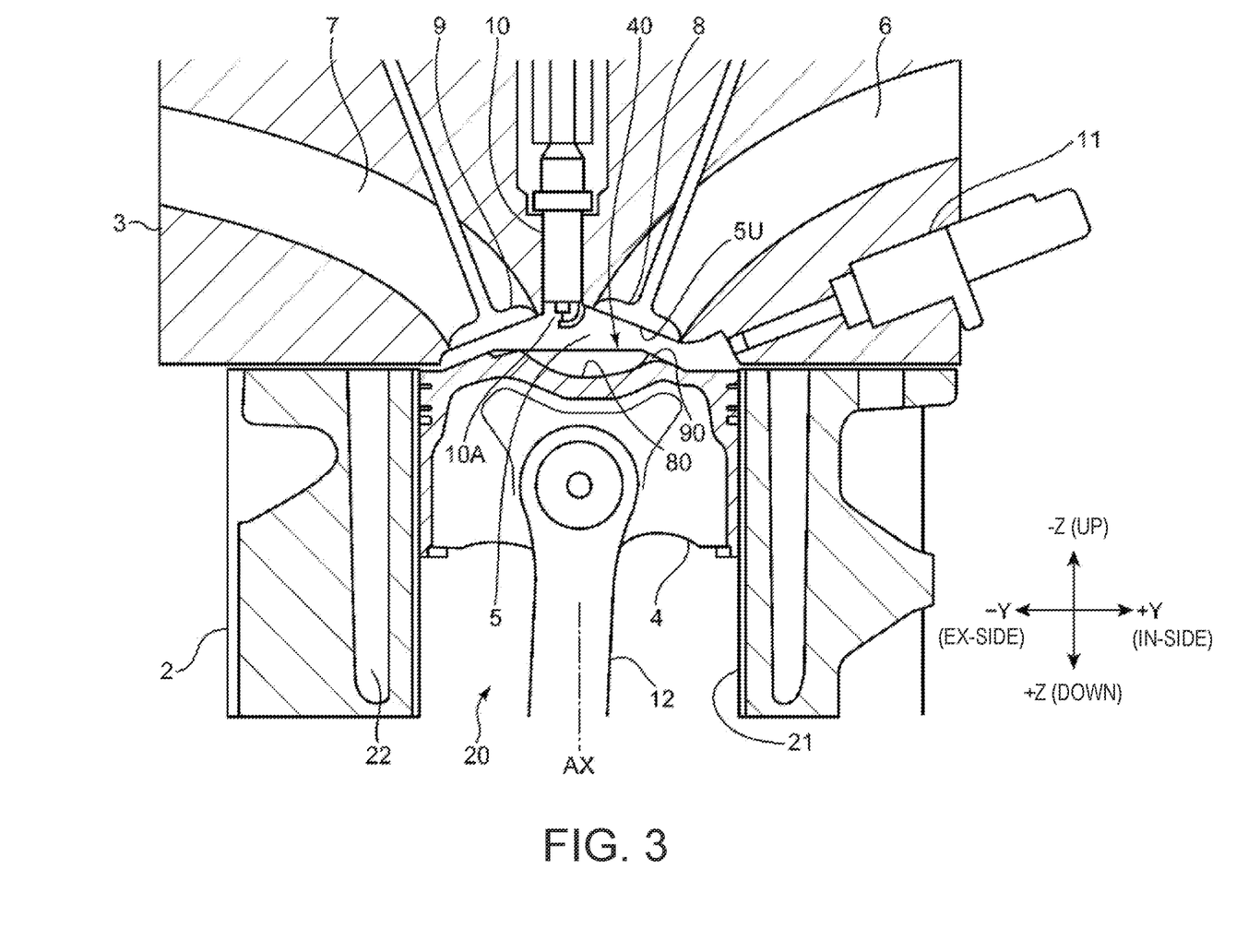
FIG. 3 is a cross-sectional view around a combustion chamber, illustrating a structure of one cylinder provided to the engine body.
Figure 4:
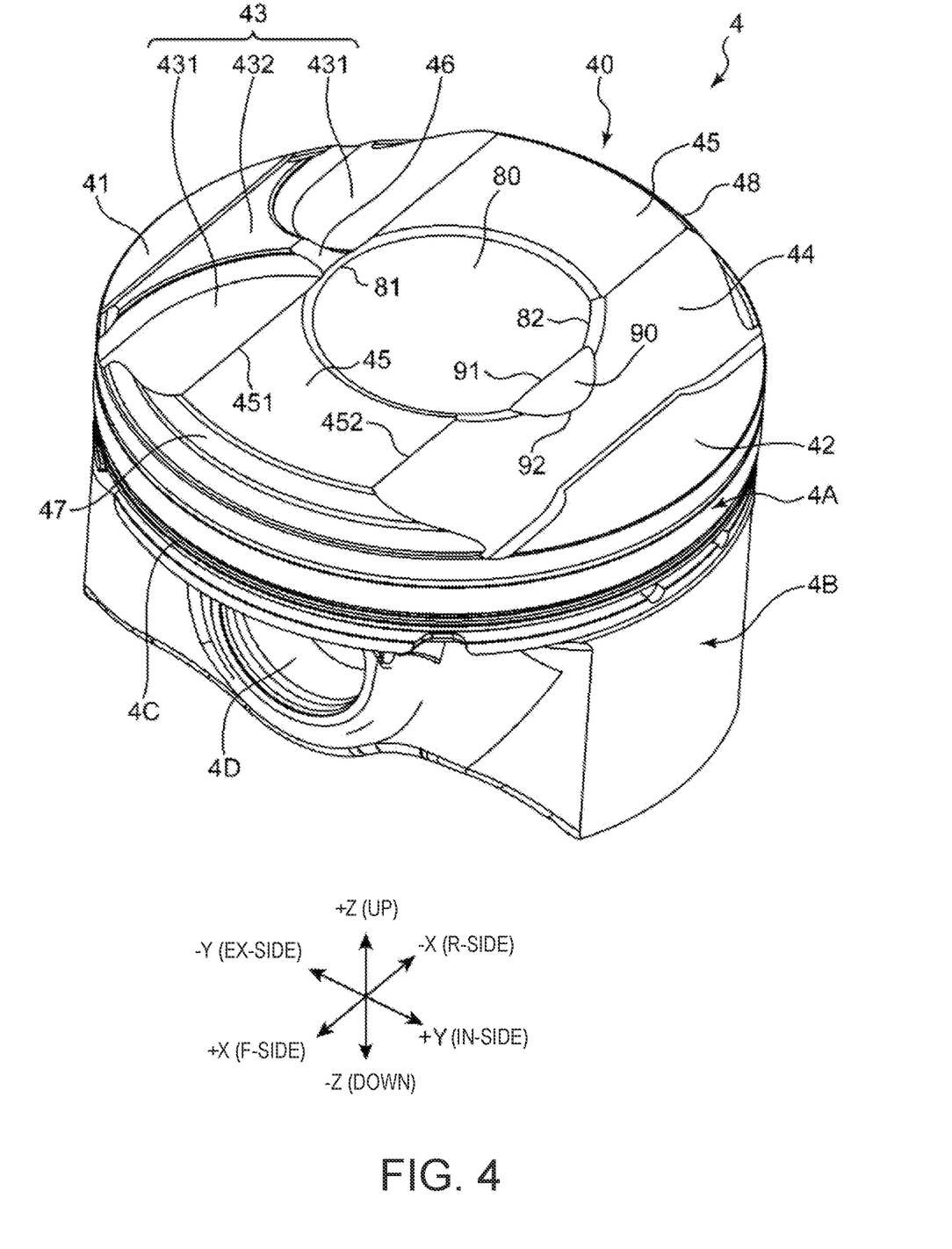
FIG. 4 is a perspective view of a piston.

FIG. 3 is a cross-sectional view around the combustion chamber 5, illustrating a structure of one cylinder 20 provided to the engine body 1. FIG. 4 is a perspective view of the piston 4. An inner wall surface of the cylinder 20 is comprised of a cylinder liner 21. A water jacket 22 is provided inside the cylinder block 2 so as to surround the cylinder 20. The piston 4 is accommodated inside the cylinder 20 so as to be slidable with respect to the cylinder liner 21.

The combustion chamber 5 is defined by the inner wall surface of the cylinder 20 (cylinder liner 21), a crown surface 40 of the piston 4, and the combustion chamber ceiling surface 5U formed on the bottom surface of the cylinder head 3 (including valve surfaces of the intake valve 8 and the exhaust valve 9). The combustion chamber ceiling surface 5U is a ceiling surface having a pentroof shape bulging upwardly. The pentroof combustion chamber ceiling surface 5U is formed with the opening of the intake port 6 and the opening of the exhaust port 7. The intake port 6 of this embodiment is a tumble port formable of a tumble flow Ft (see FIG. 5).

In FIGS. 3 and 4 and other figures, X, Y, and Z directions are indicated. The Z direction corresponds to the direction of a cylinder axis AX, the X direction corresponds to the front-and-rear direction of the engine body 1 (the extending direction of the crankshaft 15), and the Y direction corresponds to the direction orthogonal to both of the Z direction and the X direction. In the following description, a front side and a rear side in the installation direction of the engine body 1 may be referred to as "F-side (+X) and R-side (−X)," respectively, the side where the intake port 6 is disposed may be referred to as "intake side (IN-side; +Y)," the side where the exhaust port 7 is disposed may be referred to as "exhaust side (EX-side; −Y)," and an up side and a down side of the cylinder axis AX may be referred to as "up (+Z) and down (−Z)," respectively.

The spark plug 10 is attached to the cylinder head 3 in the up-and-down direction so that an ignition part 10A projects from the combustion chamber ceiling surface 5U into the combustion chamber 5. The injector 11 is substantially horizontally attached to the cylinder head 3 so that a fuel injection head at a tip end of the injector 11 faces the combustion chamber 5 from the intake side.

The piston 4 includes a piston head 4A, and a skirt part 4B provided continuously from a lower side (−Z side) of the piston head 4A. The piston head 4A is comprised of a cylindrical body, and provided on its upper surface with the crown surface 40 which constitutes a part (bottom surface) of a wall surface of the combustion chamber 5. A cavity 80 dented in a spherical cap shape is formed in a central area of the crown surface 40. Further, the piston head 4A is provided with a circumferential side surface 4C which slidingly contacts the cylinder liner 21. The circumferential side surface 4C is provided with a plurality of ring grooves into which piston rings are fitted. The skirt part 4B is provided to the piston head 4A on the +Y and −Y sides so as to reduce a swing motion of the piston 4 during the reciprocation. At the center part of the skirt part 4B in the Y direction, a piston boss 4D which defines a pin hole extending in the X direction is provided. A piston pin for a connection with a connecting rod 12 is inserted into the piston boss 4D.

The crown surface 40 is a substantially circular surface which faces the combustion chamber ceiling surface 5U in the Z direction. The crown surface 40 includes an exhaust-side bottom part 41, an intake-side bottom part 42, an exhaust-side sloped surface 43, an intake-side sloped surface 44, a flat surface 45, an inter-recess flat surface 46, an F-side wall 47, and an R-side wall 48. The crown surface 40 is also provided with the cavity 80 and a small cavity 90 as positively recessed parts in the −Z direction. Except for the cavity 80 part, the exhaust-side bottom part 41 and the intake-side bottom part 42 are base surfaces positioned at the lowest in the +Z direction in the crown surface 40, and the flat surface 45 and the inter-recess flat surface 46 are top surfaces positioned at the highest in the +Z direction in the crown surface 40.

The exhaust-side bottom part 41 and the intake-side bottom part 42 are flat surfaces extending in the XY direction perpendicular to the cylinder axis AX, and positioned at the same height in the Z direction. Note that the exhaust-side bottom part 41 and the intake-side bottom part 42 may be surfaces with a slight inclination with respect to the XY direction, or a surface with a slight convex or concave. The exhaust-side bottom part 41 is disposed near an edge of the crown surface 40 on the EX-side (−Y). The intake-side bottom part 42 is disposed near an edge of the crown surface 40 on the IN-side (+Y).

The exhaust-side bottom part 41 is a bow-shaped flat surface in which a −Y-side outer circumferential edge of the crown surface 40 (circumferential side surface 4C) is an arc, and a straight line extending in the X direction is a bow-string. The intake-side bottom part 42 is a bow-shaped flat surface in which a +Y-side outer circumferential edge of the crown surface 40 (circumferential side surface 4C) is an arc, and a straight line extending in the X direction is a bow-string. The exhaust-side bottom part 41 and the intake-side bottom part 42 are squish areas in which squish flows are formed when the piston 4 approaches a compression top dead center. In this embodiment, a surface area of the intake-side bottom part 42 is larger than that of the exhaust-side bottom part 41.

The exhaust-side sloped surface 43 is a sloped surface which gradually rises from the exhaust-side bottom part 41 toward the center part of the crown surface 40 in the Y direction (the radially central part of the crown surface 40). A lower end of the exhaust-side sloped surface 43 continues to a +Y edge of the exhaust-side bottom part 41, and an upper end continues to −Y edges of the flat surface 45 and the inter-recess flat surface 46. The exhaust-side sloped surface 43 includes a pair of recess parts 431 on the +X side and the −X side, respectively, and an inter-recess part 432 located between the recess parts 431. The recess parts 431 are substantially semicircular dents for avoiding interference with the pair of exhaust valves 9, respectively. The inter-recess part 432 is a substantially triangular part positioned between the pair of recess parts 431 so as to be one-step higher than the recess parts 431. Tilt angles of the recess parts 431 and the inter-recess part 432 with respect to the Y direction are set identically. Note that the tilt angles may be slightly different.

The intake-side sloped surface 44 is a sloped surface which gradually rises from the intake-side bottom part 42 toward the center part of the crown surface 40 in the Y direction (the radially central part of the crown surface 40). A lower end of the intake-side sloped surface 44 continues to a −Y edge of the intake-side bottom part 42, and an upper end continues to a +Y edge of the flat surface 45. Although in this embodiment the intake-side sloped surface 44 is illustrated as a sloped surface without a recess, a recess part similar to the recess parts 431 on the exhaust side may be provided when interference with the intake valve 8 occurs.

The flat surface 45 is a flat surface extending in the XY direction perpendicular to the cylinder axis AX in the center part of the crown surface 40 in the Y direction. The flat surface 45 is continuously provided between the upper end of the exhaust-side sloped surface 43 and the upper end of the intake-side sloped surface 44. The flat surface 45 has an EX edge 451 as a side on the −Y side, and an IN edge 452 as a side on the +Y side. The EX edge 451 is coupled to upper ends of the pair of the recess parts 431. The IN edge 452 is coupled to the upper end of the intake-side sloped surface 44. Since the cavity 80 exists at the radially central area of the crown surface 40, the flat surface 45 is divided into the +X side and the −X side. Note that the flat surface 45 may be a surface with a slight inclination with respect to the XY direction, or a surface with a slight convex or concave, within a range which does not substantially impede the tumble flow Ft.

The inter-recess flat surface 46 is a flat surface disposed between near upper ends of the pair of recess parts 431 of the exhaust-side sloped surface 43. The inter-recess flat surface 46 is also a flat surface extending in the XY direction, and exists in the same plane as the flat surface 45 (i.e., at the same height as the flat surface 45 in the Z direction). The inter-recess flat surface 46 extends in the −Y direction from near the center of the EX edge 451 of the flat surface 45 in the X direction.

The F-side wall 47 is a side wall extending downwardly from a +X edge of the flat surface 45. The R-side wall 48 is a side wall extending downwardly from a −X edge of the flat surface 45. The F-side wall 47 and the R-side wall 48 are bridged between the +X edges of the exhaust-side sloped surface 43 and the intake-side sloped surface 44, and between the −X edges of the exhaust-side sloped surface 43 and the intake-side sloped surface 44, respectively.

Figure 9:
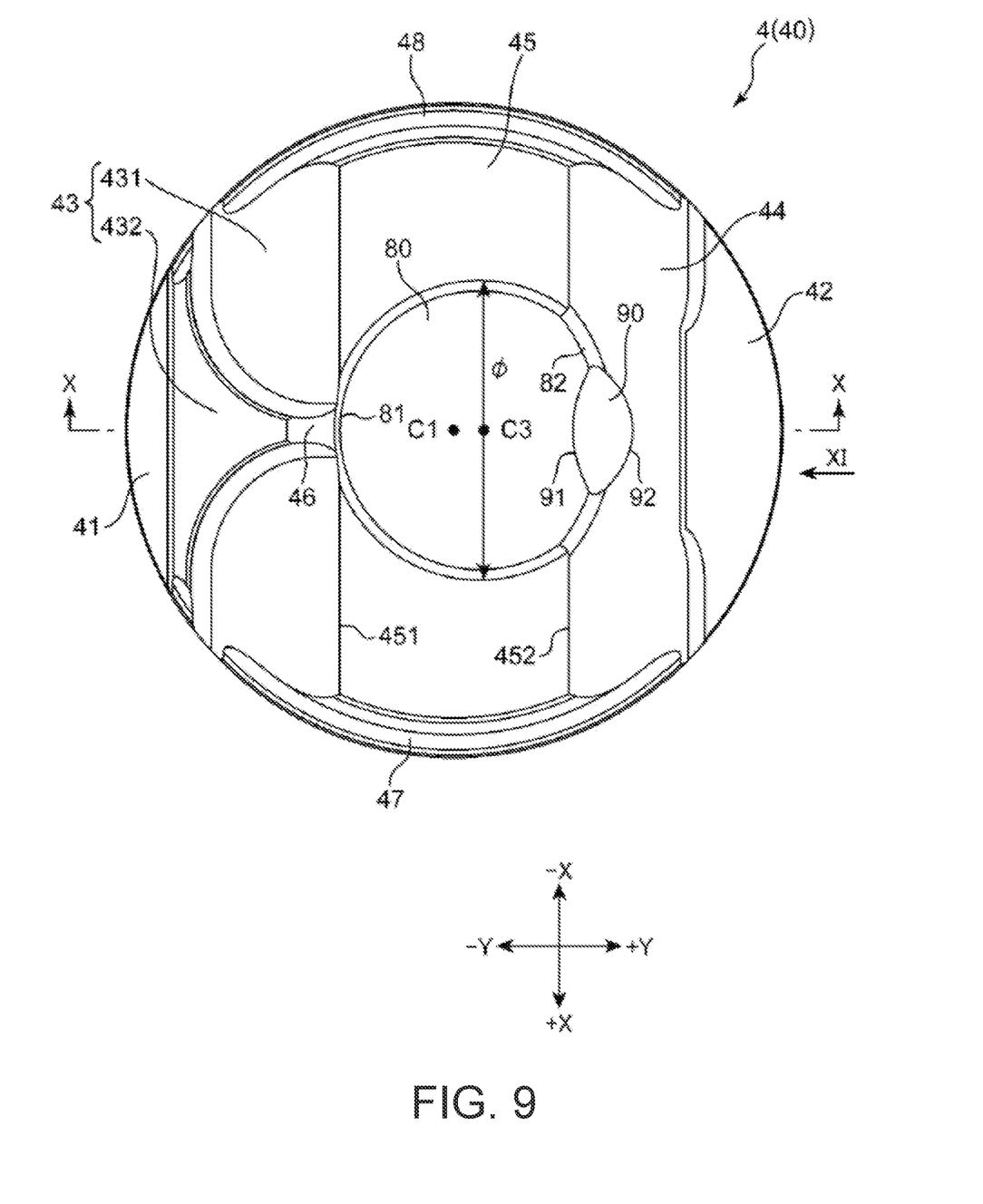
FIG. 9 is a plan view of a crown surface of the piston.

Referring to a top view of the crown surface 40 illustrated in FIG. 9, the cavity 80 is provided to be recessed in the spherical cap shape in the flat surface 45, and has a circular opening edge at least in a part of the flat surface 45 when seen from above. Although the cavity 80 is located at the center of the crown surface 40 in the X direction, it is located to be eccentric to the +Y side in the Y direction. That is, although the flat surface 45 extends in the X direction at the center in the Y direction, the cavity 80 is located to be slightly offset toward the +Y direction. Although an EX edge 81 of the cavity 80 is located at the substantially same position as the EX edge 451 of the flat surface 45, an IN edge 82 protrudes to the +Y side from the IN edge 452, and overlaps with an upper-end part of the intake-side sloped surface 44. This offset will be described later in detail.

The small cavity 90 is a dent smaller than the cavity 80, and located on the +Y side of the cavity 80. The small cavity 90 is formed by the IN edge 82 of the cavity 80 and near an upper end of the intake-side sloped surface 44 being dented in a bowl shape. That is, the small cavity 90 is a small recess part provided continuously from the intake side of the cavity 80, and located to be deviated toward the intake side of the crown surface 40. Note that the small cavity 90 is located at the center of the crown surface 40 in the X direction. The shape of the small cavity 90 when seen from above is a substantially oval shape.

The small cavity 90 includes, as outer circumferential edges, an EX circumferential edge 91 on the −Y side, and an IN circumferential edge 92 on the +Y side. When seen from the top, the EX circumferential edge 91 has a first curve bulging to the −Y side, and the IN circumferential edge 92 has a second curve bulging to the +Y side. A curvature of the second curve of the IN circumferential edge 92 is larger than that of the first curve of the EX circumferential edge 91. That is, a degree of bulging of the IN circumferential edge 92 to the +Y side is larger than that of the EX circumferential edge 91 to the −Y side. By setting such curvatures, the small cavity 90 has a shape capable of narrowing down an in-cylinder flow path from the IN circumferential edge 92 toward the EX circumferential edge 91.

Offset of Ignition Part and Cavity

Figure 5:
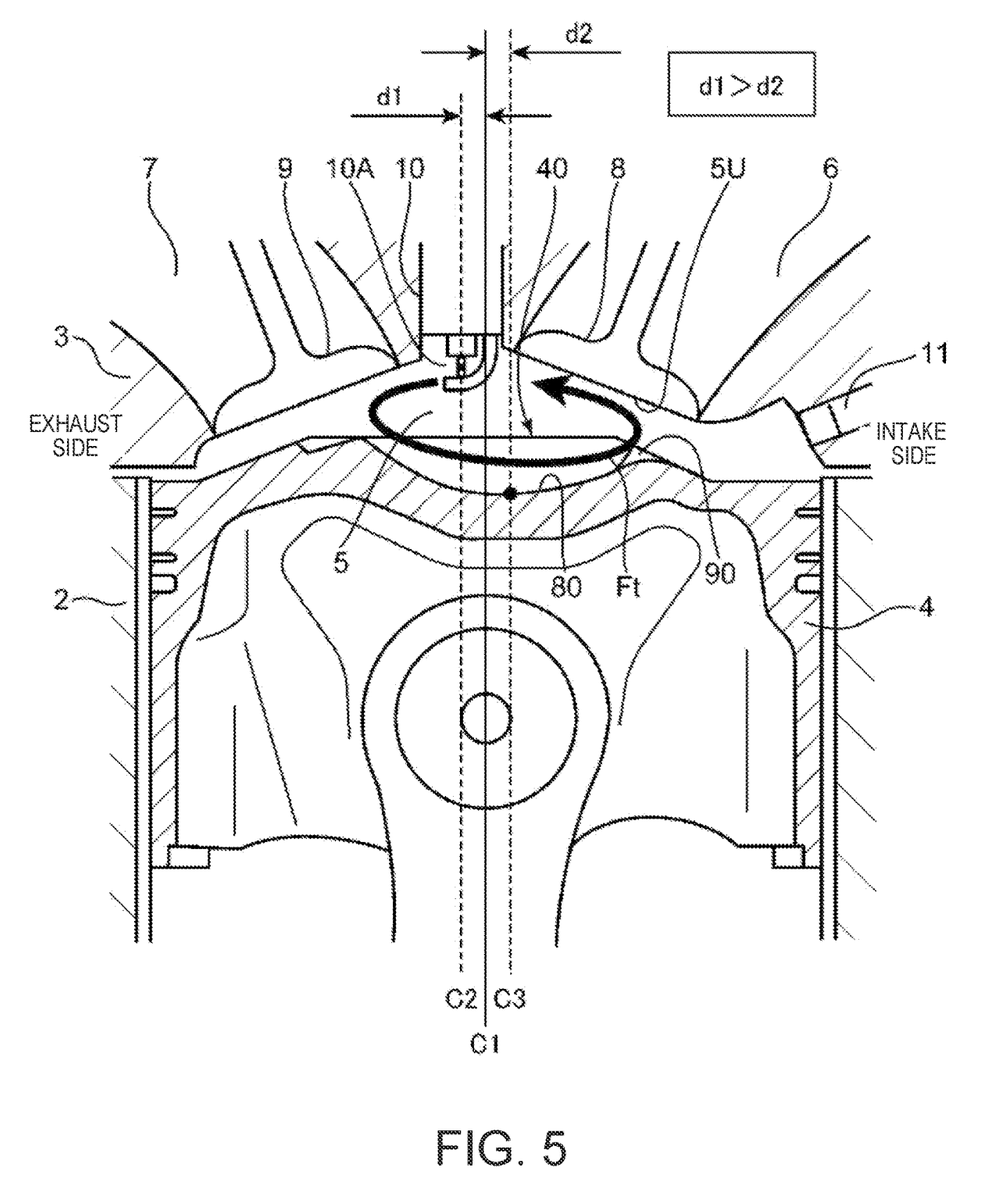
FIG. 5 is an enlarged view of a substantial part of FIG. 3.
Figure 6:
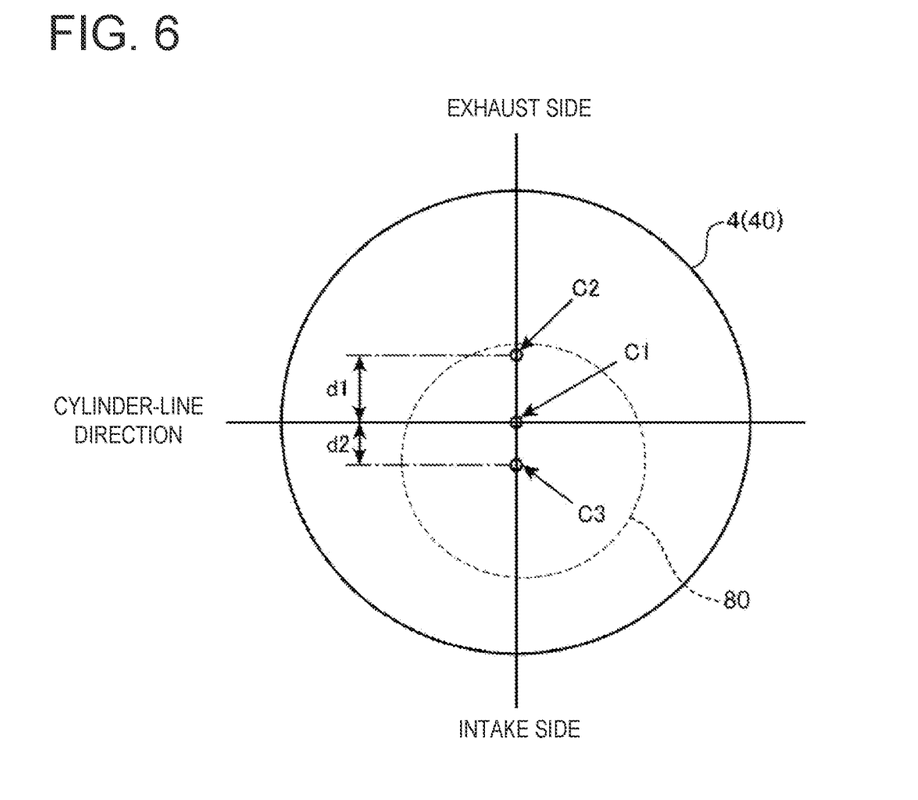
FIG. 6 is a schematic view illustrating a relationship between a cylinder axis, an ignition position, and a cavity center point.

Next, an offset structure of the ignition part 10A of the spark plug 10 and the cavity 80 is described with reference to FIGS. 5 and 6. FIG. 5 is an enlarged view of a substantial part of FIG. 3, and FIG. 6 is a schematic view illustrating the offset structure. In FIGS. 5 and 6, a cylinder axial line C1 which is a center axis of the cylinder 20, an ignition position C2 of the mixture gas by the ignition part 10A, and a cavity center point C3 which is a radial center of the opening edge of the cavity 80 are illustrated. Since in this embodiment the cavity 80 is the recess part in the spherical cap shape, the cavity center point C3 is the deepest part in the cavity 80.

Further, in FIG. 5, the tumble flow Ft which flows inside the combustion chamber 5 is illustrated. The tumble flow Ft flows into the combustion chamber 5 from the opening of the intake port 6 of the pentroof combustion chamber ceiling surface 5U. The tumble flow Ft first flows toward the exhaust side along the inflow direction, and then, the flowing direction is inverted to be from the exhaust side toward the intake side on the cavity 80. Then, the tumble flow Ft flows upwardly from an intake-side end part of the cavity 80 toward the combustion chamber ceiling surface 5U, and accordingly returns to the exhaust side. Thereafter, a similar vertical vortex flow is repeatedly generated.

The ignition position C2 (ignition part 10A) is located to be offset toward the exhaust side with respect to the cylinder axial line C1 in a cross-sectional view taken along the cylinder axis AX, and the ignition position C2 is disposed at the combustion chamber ceiling surface 5U above the area where the cavity 80 is formed. On the other hand, the cavity center point C3 is located to be offset toward the intake side with respect to the cylinder axial line C1 in the cross-sectional view taken along the cylinder axis AX. Note that the ignition position C2 and the cavity center point C3 are each disposed on a straight line connecting the intake side and the exhaust side while passing the cylinder axial line C1.

In FIGS. 5 and 6, an amount of offset of the ignition position C2 with respect to the cylinder axial line C1 is indicated by d1, and an amount of offset of the cavity center point C3 with respect to the cylinder axial line C1 is indicated by d2. In this embodiment, the offset amount of the ignition position C2 toward the exhaust side is larger than the offset amount of the cavity center point C3 toward the intake side. That is, the offset amounts of the ignition position C2 and the cavity center point C3 are set to satisfy the relationship d1>d2. Note that, in FIG. 6, the relationship between d1 and d2 is illustrated exaggeratedly. For example, d1=3.7 mm and d2=3.4 mm in the cylinder 20 with a bore diameter of about 100 mm.

Figure 7:
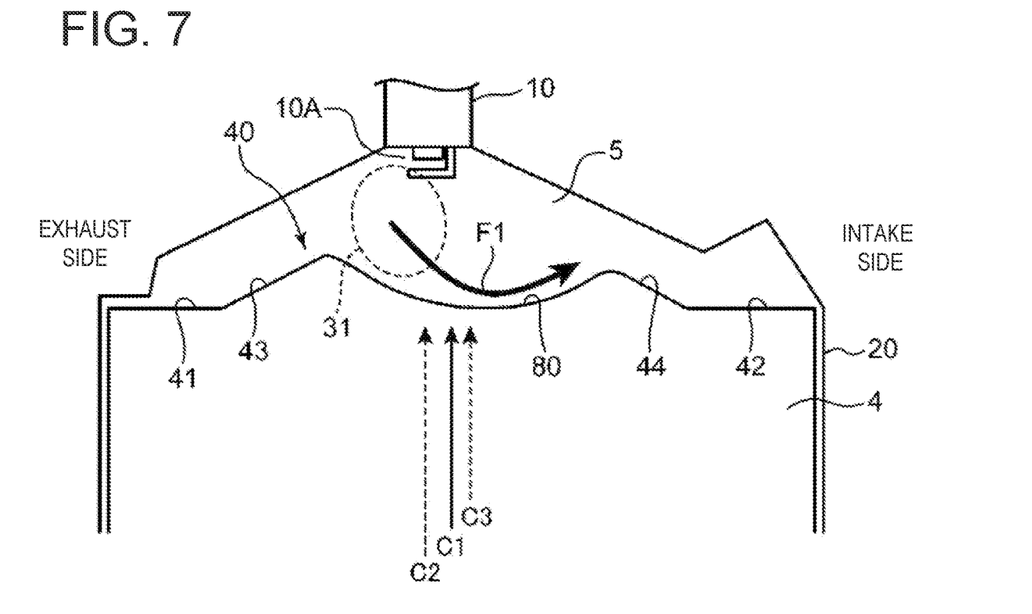
FIG. 7 is a schematic view of the combustion chamber, illustrating flame propagation by a tumble flow.

Next, an advantage of the offset structure of the ignition part 10A and the cavity 80 is described. FIG. 7 is a schematic cross-sectional view of the combustion chamber 5 taken along the cylinder axis AX, illustrating flame propagation by the tumble flow Ft. The cavity 80 is formed to be recessed in the crown surface 40 of the piston 4. The tumble flow Ft formed inside the combustion chamber 5 becomes a flow from the exhaust side to the intake side as illustrated in FIG. 5, when focusing on a part of the tumble flow Ft flowing along a wall surface (bottom surface) of the cavity 80. The ignition part 10A of the spark plug 10 forcibly ignites the mixture gas inside the combustion chamber 5 to form a flame ball 31 near the ignition part 10A. When the tumble flow Ft acts on the flame ball 31, the flame propagates to the intake side as indicated by an arrow F1 in FIG. 7.

In such a combustion chamber 5, the ignition position C2 by the ignition part 10A is offset toward the exhaust side from the cylinder axial line C1. Therefore, it is possible to form the flame ball 31 while the mixture gas is ignited at the upstream side of the tumble flow Ft which flows in the cavity 80, and propagate the flame to the intake side while the flame is carried by the tumble flow Ft. Moreover, the cavity center point C3 is offset toward the intake side from the cylinder axial line C1. Therefore, it becomes easier for the flame generated on the exhaust side to propagate to the intake side by the tumble flow Ft. That is, an area in which the flame can flow to the intake side along the cavity 80 becomes longer by the amount of offset, and thus, the flame can promptly be propagated to the intake side. As a result, the combustion speed can be increased, and thermal efficiency and fuel efficiency can be improved.

Moreover, the offset amounts of the ignition position C2 and the cavity center point C3 with respect to the cylinder axial line C1 are set to satisfy the relationship d1>d2. Therefore, it is possible to generate the flame ball 31 at a further upstream side of the tumble flow Ft which flows in the cavity 80, and to propagate the flame to the intake side. As a result, the combustion can be further accelerated.

Figure 8A:
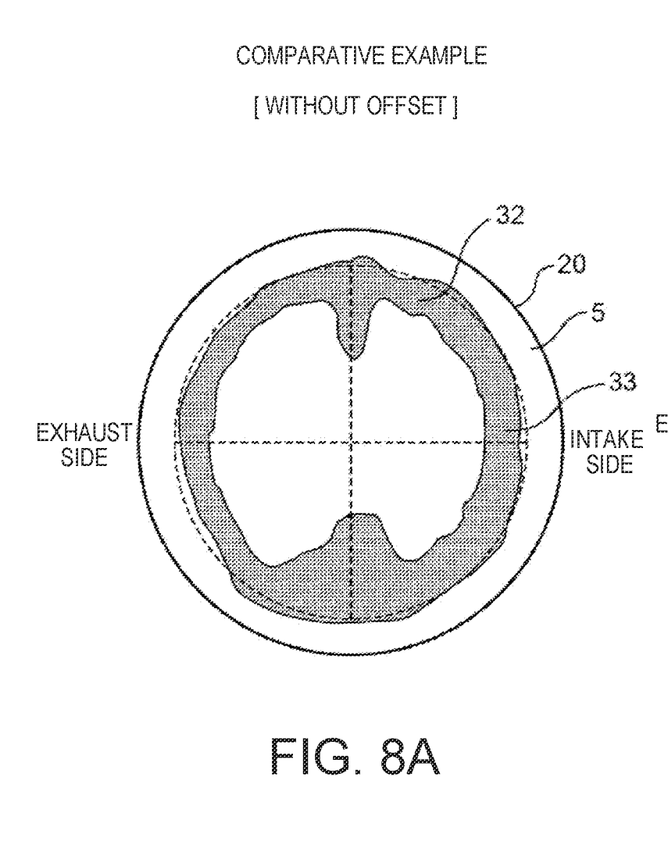
Figure 8B:
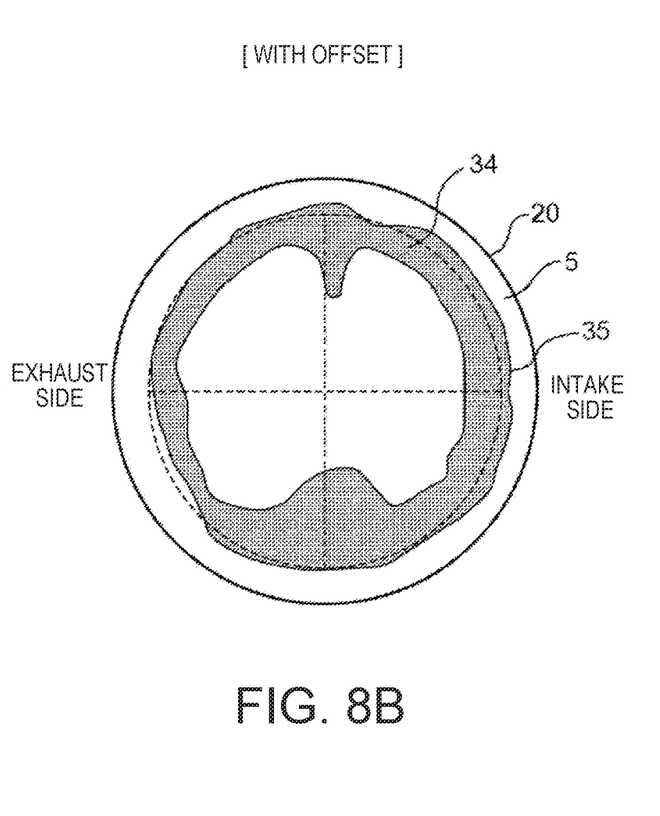

FIGS. 8A and 8B are plan views of the combustion chamber, schematically illustrating the propagation state of flame at a crank angle of 380°. FIG. 8A illustrates a flame propagation state in a case of a combustion chamber structure of a comparative example where the ignition position C2 and the cavity center point C3 are not offset with respect to the cylinder axial line C1. Here, a flame 32 propagating toward the circumferential edge of the combustion chamber 5 is illustrated. When focusing on an intake-side propagation part 33 of the flame 32 which propagates to the intake side, it is apparent that the flame propagates only to near a reference circle indicated by a broken line in the figure.

On the other hand, FIG. 8B illustrates a flame propagation state in a case of the combustion chamber structure of this embodiment where the ignition position C2 and the cavity center point C3 are offset with respect to the cylinder axial line C1. FIG. 8B illustrates a state in which a flame 34 having the flame ball 31 illustrated in FIG. 7 as a fire core propagates toward the circumferential edge of the combustion chamber 5. When focusing on an intake-side propagation part 35 of the flame 34 which propagates to the intake side, it is apparent that the flame propagates to the intake side exceeding the reference circle indicated by a broken line in the figure. This means that the flame 34 is promptly propagated to the intake side by the tumble flow Ft. That is, it is demonstrated that the combustion chamber structure of this embodiment increases the combustion speed.

Contrivance in Shape of Piston Crown Surface

In order to achieve the flame propagation as described above, contribution of the tumble flow Ft is essential. That is, it is required that the strong tumble flow Ft remains in the combustion chamber 5 even after the ignition part 10A ignites the mixture gas (i.e., to maintain the tumble flow Ft until the latter half of the compression stroke). Various contrivances in shape for maintaining the tumble flow Ft until the latter half of the compression stroke, and accompanying contrivance are made for the crown surface 40 of the piston 4 of this embodiment. Such contrivances in shape are described with reference to FIGS. 9 to 11 in addition to the forementioned figures. FIG. 9 is a plan view of the crown surface 40 of the piston 4, FIG. 10 is a cross-sectional view taken along a line X-X of FIG. 9, and FIG. 11 is a view when seen in a direction of an arrow XI in FIG. 9.

<Relationship Between Height of Crown Surface, Depth of Cavity, and Diameter>

Figure 10:
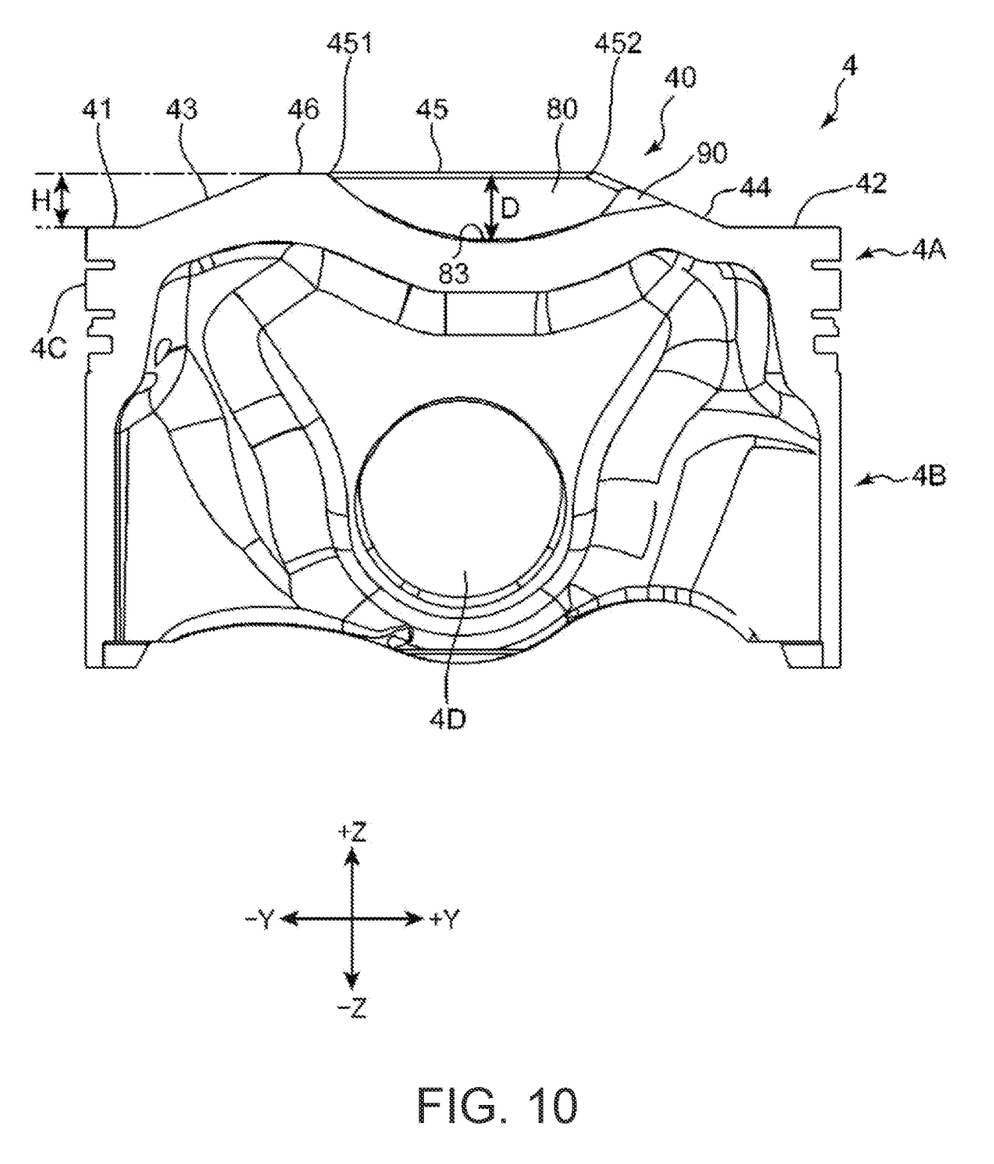
FIG. 10 is a cross-sectional view taken along a line X-X of FIG. 9.
Figure 11:
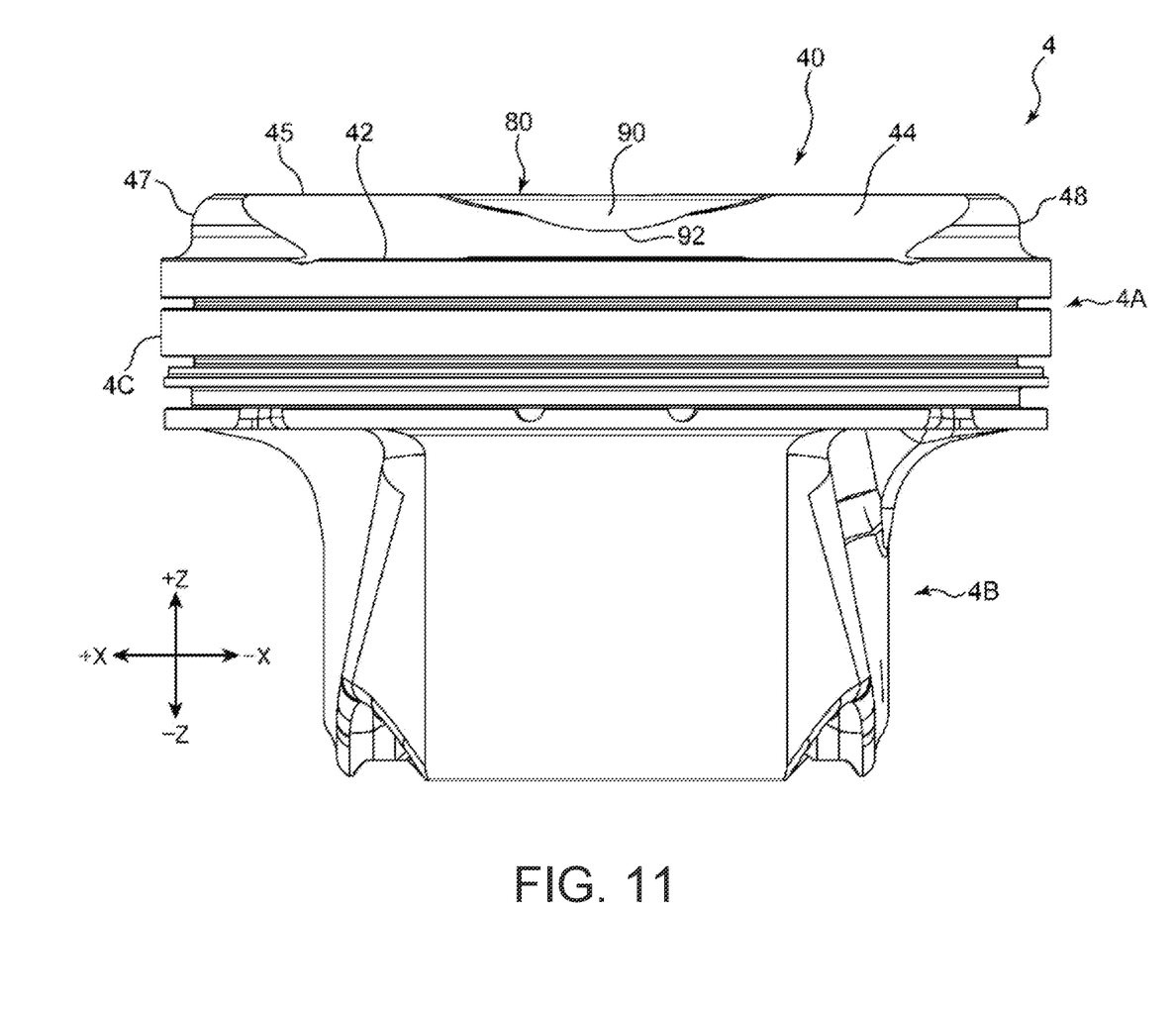
FIG. 11 is a view when seen in a direction of an arrow XI in FIG. 9.

In FIGS. 9 and 10, as parameters related to the shape of the crown surface 40, a height H, a cavity depth D, and a cavity diameter φ are illustrated. The height H is a height of a bulging part which is provided to the crown surface 40 so as to bulge to the cylinder block 2 side. In this embodiment, the height H is a height in the Z direction from the exhaust-side bottom part 41 or the intake-side bottom part 42, which are the lowest surfaces and the outer edge parts of the crown surface 40 on the −Y side and the +Y side, respectively, to the flat surface 45 (and the inter-recess flat surface 46) which is the highest surface.

The cavity depth D is a distance from the deepest part of a bottom surface 83 of the cavity 80 to the flat surface 45, which is the top surface of the crown surface 40 (in this embodiment, the depth of the cavity 80 at the cavity center point C3). The cavity diameter φ is a diameter of an outer circumference of the spherical cap-shaped cavity 80. As illustrated in FIG. 9, in this embodiment, the IN edge 82 of the cavity 80 on the +Y side overlaps with the intake-side sloped surface 44, and the small cavity 90 is also provided. Therefore, the outer circumference of the cavity 80 when seen from above does not have a simple circular shape on the +Y side. In such a case, the cavity diameter φ is represented by a straight line, in an area of the flat surface 45 in which the original outer circumferential shape appears, extending from an arc on one end side to an arc on the other end side while passing through the cavity center point C3.

As described above, the geometric compression ratio of the combustion chamber 5 is set within the range of 11:1 or higher and 13:1 or lower. Within this range of the compression ratio, the relationship between the height H, the cavity depth D, and the cavity diameter φ of the crown surface 40 is desirable to be set as follows, in terms of accelerating the combustion by maintaining the tumble flow Ft until the latter half of the compression stroke.

First, as for D/H which is a ratio of the cavity depth D to the height H, it is desirable to satisfy the relationship of $0.3<D/H<1.9$. Further desirably, near the compression ratio of 12:1, the D/H is set within a range of $0.75<D/H<1.71$.

As the height H decreases, it becomes easier to maintain the tumble flow Ft until the latter half of the compression stroke. However, when the height H is too low, the high compression ratio cannot be achieved. As the cavity depth D is deeper, the range (time) in which the tumble flow Ft flows in the cavity 80 becomes longer. Therefore, there appears a tendency that the tumble flow Ft is weakened by, for example, a contact resistance of the tumble flow Ft to an inner surface of the cavity 80. Further, when the cavity depth D is too deep, the compression ratio becomes lower. However, by setting the D/H to the relationship described above, the combustion speed can be increased by maintaining the tumble flow Ft until the latter half of the compression stroke, while achieving the high compression ratio. As a result, the fuel efficiency can be improved.

Next, as for φ/D which is a ratio of the cavity diameter φ to the cavity depth D, it is desirable to satisfy the relationship of $5.0<φ/D<32.0$. Further desirably, the φ/D is set within a range of $5.0<φ/D<15.0$.

As the cavity diameter φ increases, the tumble flow Ft is caused to flow along an inner circumferential surface of the cavity 80, and thus, the maintaining of the tumble flow Ft until the latter half of the compression stroke becomes easier. However, when the cavity diameter y is too large, the compression ratio becomes lower. As for the cavity depth D, it is as described above. However, by setting the φ/D to the relationship described above, the combustion speed can be increased by maintaining the tumble flow Ft until the latter half of the compression stroke while achieving the high compression ratio.

<Mode of Cavity Offset>

The cavity 80 is disposed at the crown surface 40 to be offset toward the IN (+Y) side. In detail, the cavity 80 is disposed at the crown surface 40 such that the EX edge 81 of the cavity 80 is in agreement with the upper end of the exhaust-side sloped surface 43 (the EX edge 451 of the flat surface 45). On the other hand, the IN edge 82 of the cavity 80 protrudes to the +Y side from the IN edge 452 of the flat surface 45, and overlaps with the upper-end part of the intake-side sloped surface 44. Note that the EX edge 81 may be located on the intake side of the upper end of the exhaust-side sloped surface 43.

By the cavity 80 being provided to the crown surface 40 to be recessed, the tumble flow Ft can be maintained even in the latter half of the compression stroke by utilizing the space of the cavity 80. Therefore, it becomes easier to maintain the tumble flow Ft until the latter half of the compression stroke. In the cavity 80, the tumble flow Ft becomes a flow from the exhaust side to the intake side (see FIG. 5). Here, if the EX edge 81 of the cavity 80 overlaps with the exhaust-side sloped surface 43 of the crown surface 40, a recess corresponding to the dent of the cavity 80 appears in the exhaust-side sloped surface 43. In this case, when the tumble flow Ft remains until the latter half of the compression stroke, the tumble flow Ft vigorously flows into the cavity 80 from the recess. This force of the tumble flow Ft may impede the flame propagation to the radially outward of the combustion chamber 5 on the exhaust side. As a result, self-ignition of unburnt gas may occur on the exhaust side of the combustion chamber 5, which may cause knocking.

However, in this embodiment, the cavity 80 is formed in the crown surface 40 such that the EX edge 81 of the cavity 80 is in agreement with the upper end of the exhaust-side sloped surface 43. Therefore, the recess in which a part of the cavity 80 appears is not formed in the exhaust-side sloped surface 43, and the exhaust-side sloped surface 43 serves as a wall which regulates the inflow of the tumble flow Ft to the cavity 80. Therefore, the vigorous tumble flow Ft from the exhaust side to the inside of the cavity 80 is not formed, and the flame propagation to the radially outward on the exhaust side is not impeded. As a result, the knocking attributed to the self-ignition of unburnt gas is reduced.

Further, the cavity 80 is disposed at the crown surface 40 such that the IN edge 82 of the cavity 80 overlaps with the upper-end part of the intake-side sloped surface 44. Therefore, the size of the cavity 80 can be larger by the overlapping amount with the upper-end part of the intake-side sloped surface 44. Thus, it becomes easier to maintain the tumble flow Ft until the latter half of the compression stroke. Further, since the cavity 80 is accordingly positioned eccentrically toward the intake side of the crown surface 40, the tumble flow Ft is more easily introduced to the intake side along the cavity 80. As a result, the flame propagation originated from the flame ball 31 to the intake side can be accelerated, and the combustion speed can be increased. Thereby, the improvement in the thermal efficiency as well as the fuel efficiency can be achieved.

<Arrangement of Small Cavity>

In the crown surface 40 of this embodiment, the small cavity 90 is formed in addition to the cavity 80. The small cavity 90 is formed by the IN edge 82 of the cavity 80 and the upper-end area of the intake-side sloped surface 44 being dented in a bowl shape. As described above, the small cavity 90 includes the EX circumferential edge 91 having the first curve bulging to the −Y side, and the IN circumferential edge 92 having the second curve bulging to the +Y side.

The EX circumferential edge 91 comes into (−Y side of) the cavity 80 from the IN edge 82 of the cavity 80. On the other hand, the IN circumferential edge 92 is provided protrudingly to the +Y side from the IN edge 82 (near the upper end of the intake-side sloped surface 44) to near an intermediate part of the intake-side sloped surface 44 in the Y direction. When seen from above, the curvature of the second curve of the IN circumferential edge 92 is larger than that of the first curve of the EX circumferential edge 91. Note that, as illustrated in FIG. 11, the IN circumferential edge 92 curves to bulge downwardly (−Z) in a side view, which is similarly applied to the EX circumferential edge 91.

According to this configuration, the small cavity 90 is structured to continue to the IN edge 82 of the cavity 80, and thus, the dent of the cavity provided to the crown surface 40 is elongated toward the intake side. As a result, the size of the cavity can be increased, and the maintaining of the tumble flow Ft until the latter half of the compression stroke can be further easier.

Further, the curvature of the second curve provided to the IN circumferential edge 92 of the small cavity 90 is larger than that of the first curve provided to the EX circumferential edge 91. Therefore, the small cavity 90 has a shape more largely bulging toward the intake side. As a result, it becomes easier for the flame of the mixture gas to propagate to the intake side by the tumble flow Ft. Thereby, the combustion speed is increased, and improvement in the thermal efficiency as well as the fuel efficiency can be achieved.

Modifications

Although one embodiment of the present disclosure is described above, the present disclosure is not limited by this embodiment, but the following modifications are possible.

(1) In the embodiment, the offset amount (d1) of the ignition part 10A toward the exhaust side with respect to the cylinder axial line C1 is set to be larger than the offset amount (d2) of the cavity center point C3 toward the intake side (FIG. 6; d1>d2). This mode is one example, and the relationship between d1 and d2 is not limited, as long as the ignition part 10A is offset toward the exhaust side, and the cavity center point C3 is offset toward the intake side. For example, the relationship may be set to d1=d2, or d1<d2.

(2) In the embodiment, the cavity 80 has the spherical cap shape, in which the shape of the outer circumference of the cavity 80 except for the part of the IN edge 82 is circular when seen from above. The cavity in the spherical cap shape as used herein is not limited to the cavity having the outer circumference in the circular shape in a top view, but may include a shape approximate to circular, or an oval shape. When the cavity 80 has the shape other than circular, the center of the approximate circle may be treated as the cavity center point C3. Further, when the cavity 80 has the oval shape, an intersecting point of a long axis and a short axis may be treated as the cavity center point C3.

Further, the dented shape of the cavity 80 is not limited to an absolute spherical cap shape, buy may be any shape as long as the cavity 80 is dented in a bowl shape. For example, the cavity 80 may have a shape in which a part of the bottom surface 83 of the cavity 80 is flat, or the deepest part of the bottom surface 83 is shifted from the cavity center point C3.

(3) In the embodiment, the cavity 80 is disposed at the crown surface 40 such that the EX edge 81 of the cavity 80 is in agreement with the upper end of the exhaust-side sloped surface 43 (the EX edge 451 of the flat surface 45). As described above, the EX edge 81 may be located on the intake side (+Y side) of the EX edge 451, or on the contrary, the EX edge 81 may be located on the exhaust side (−Y side) of the EX edge 451. Further, the cavity 80 may be disposed at the crown surface 40 such that the IN edge 82 is in agreement with the upper end of the intake-side sloped surface 44 (the IN edge 452 of the flat surface 45).

(4) In the embodiment, the small cavity 90 is provided continuously from the IN edge 82 of the cavity 80. Alternatively, the small cavity 90 may not be provided. Even in the case where the small cavity 90 is provided, when seen from above, the curvatures of the first curve of the EX circumferential edge 91 and the second curve of the IN circumferential edge 92 may be set identically, or the curvature of the first curve may be set to be larger than that of the second curve.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
8 Intake Valve
9 Exhaust Valve
11 Injector
10 Spark Plug
20 Cylinder
4 Piston
40 Crown Surface
5 Combustion Chamber
5U Combustion Chamber Ceiling Surface (Pentroof Ceiling Surface)
59 Turbocharger (Booster)
6 Intake Port
7 Exhaust Port
80 Cavity
81 EX Edge
81 IN Edge
AX Cylinder Axis
C1 Cylinder Axial Line
C2 Ignition Position
C3 Cavity Center Point
Ft Tumble Flow

What is claimed is:

1. An engine, comprising:
a combustion chamber defined by a crown surface of a piston, an inner wall surface of a cylinder in which the piston is slidably accommodated, and a pentroof ceiling surface formed in a cylinder head; and
an ignition part of a spark plug disposed at the ceiling surface and configured to achieve flame propagation combustion inside the combustion chamber,
wherein a cavity recessed in a spherical cap shape is formed in a central area of the crown surface,
wherein an opening of an intake port configured to supply intake air to the combustion chamber and an opening of an exhaust port configured to discharge exhaust gas from the combustion chamber are formed in the ceiling surface,
wherein when a side on which the intake port is disposed is an intake side, and a side on which the exhaust port is disposed is an exhaust side, and when seen in a cross-sectional view taken along a cylinder axis:

an ignition position of the ignition part is located above the cavity to be offset toward the exhaust side with respect to a cylinder axial line of a center axis of the cylinder, and a center point of the cavity is located to be offset toward the intake side with respect to the cylinder axial line of the center axis of the cylinder, and wherein an amount of offset of the ignition part toward the exhaust side is larger than an amount of offset of the center point of the cavity toward the intake side.

2. The engine of claim 1, further comprising a booster configured to boost intake air to be supplied from the intake port to the combustion chamber.

3. The engine of claim 2, further comprising an injector disposed on the intake side of the combustion chamber and configured to inject fuel into the combustion chamber.

4. The engine of claim 3, wherein the engine is a longitudinal engine provided with six cylinders arranged in line in a front-and-rear direction of a vehicle on which the engine is mounted.

5. The engine of claim 1, further comprising a booster configured to boost intake air to be supplied from the intake port to the combustion chamber.

6. The engine of claim 1, further comprising an injector disposed on the intake side of the combustion chamber and configured to inject fuel into the combustion chamber.

7. The engine of claim 1, wherein the engine is a longitudinal engine provided with six cylinders arranged in line in a front-and-rear direction of a vehicle on which the engine is mounted.

8. The engine of claim 5, further comprising an injector disposed on the intake side of the combustion chamber and configured to inject fuel into the combustion chamber.

9. The engine of claim 8, wherein the engine is a longitudinal engine provided with six cylinders arranged in line in a front-and-rear direction of a vehicle on which the engine is mounted.

10. The engine of claim 1, wherein the center point of the cavity is a deepest part of the cavity.

11. The engine of claim 8, wherein the center point of the cavity is a deepest part of the cavity.

12. The engine of claim 9, wherein the center point of the cavity is a deepest part of the cavity.

13. The engine of claim 1, wherein the cavity is disposed at the crown surface such that an intake-side edge of the cavity protrudes toward the intake side from an intake-side edge of a flat surface to overlap with an upper-end part of an intake-side sloped surface, the flat surface being a top surface of the crown surface, and the intake-side sloped surface being a sloped surface gradually rising toward a radially central part of the crown surface.

14. The engine of claim 13, wherein the cavity is disposed at the crown surface such that an exhaust-side edge of the cavity is in agreement with an upper end of an exhaust-side sloped surface and an exhaust-side edge of the flat surface, the exhaust-side sloped surface being a sloped surface gradually rising toward a radially central part of the crown surface.

15. The engine of claim 1,
wherein a small cavity is formed in the crown surface in addition to the cavity, and
wherein the small cavity is formed by an intake-side edge of the cavity and an upper-end area of an intake-side sloped surface being dented in a bowl shape, the intake-side sloped surface being a sloped surface gradually rising toward a radially central part of the crown surface.

* * * * *